(12) United States Patent
Okamoto

(10) Patent No.: US 8,033,297 B2
(45) Date of Patent: Oct. 11, 2011

(54) SOLENOID VALVE MANIFOLD

(75) Inventor: Kazuya Okamoto, Tokyo (JP)

(73) Assignee: Koganei Corporation, Tokyo (JP)

( * ) Notice: Subject to any disclaimer, the term of this patent is extended or adjusted under 35 U.S.C. 154(b) by 840 days.

(21) Appl. No.: 12/067,956

(22) PCT Filed: Jun. 26, 2006

(86) PCT No.: PCT/JP2006/312745
§ 371 (c)(1),
(2), (4) Date: Mar. 25, 2008

(87) PCT Pub. No.: WO2007/034607
PCT Pub. Date: Mar. 29, 2007

(65) Prior Publication Data
US 2009/0139591 A1    Jun. 4, 2009

(30) Foreign Application Priority Data
Sep. 26, 2005 (JP) .................... 2005-277579

(51) Int. Cl.
*F16L 37/00* (2006.01)
(52) U.S. Cl. ............. 137/884; 285/26; 285/124.4
(58) Field of Classification Search ............. 137/269, 137/884; 285/26, 124.2, 124.4, 305
See application file for complete search history.

(56) References Cited

U.S. PATENT DOCUMENTS

| | | | |
|---|---|---|---|
| 4,076,279 A | 2/1978 | Klotz et al. | |
| 5,219,185 A * | 6/1993 | Oddenino | 285/26 |
| 5,271,646 A * | 12/1993 | Allread et al. | 285/124.2 |
| 5,415,437 A * | 5/1995 | Asou et al. | 285/124.4 |
| 5,699,834 A | 12/1997 | Hayashi et al. | |
| 5,944,056 A | 8/1999 | Miyazoe et al. | |
| 6,173,745 B1 * | 1/2001 | Hayashi et al. | 137/884 |
| 6,237,634 B1 | 5/2001 | Narita et al. | |
| 2003/0193187 A1 | 10/2003 | Takada et al. | |

FOREIGN PATENT DOCUMENTS

| | | |
|---|---|---|
| JP | 52-40824 | 3/1977 |
| JP | 56-115089 | 9/1981 |
| JP | 2163579 | 6/1990 |
| JP | 11063348 | 3/1999 |
| JP | 11082850 | 3/1999 |
| JP | 2003301986 | 10/2003 |
| JP | 2004108413 | 4/2004 |

OTHER PUBLICATIONS

International Search Report for PCT/JP2006/312745.

* cited by examiner

*Primary Examiner* — John Fox
(74) *Attorney, Agent, or Firm* — McCormick, Paulding & Huber LLP

(57) ABSTRACT

Attaching/detaching workability of a fitting block to/from an solenoid valve assembly is improved, and a fixing strength of the fitting block to the solenoid valve assembly is enhanced. The fitting block 41 is intended to be detachably mounted to the solenoid valve assembly 12, and the fitting block 41 is provided with port connecting tubes 42 and 43 detachably fitted in output ports A and B, and tube fittings 44 and 45 to which tubes 46 are connected. The fitting block 41 is further provided with an engagement projection 52 which is engaged with a concave portion 51 formed in the solenoid valve assembly 12, and the fitting block 41 is fixed to the solenoid valve assembly 12 via a portion of the engagement projection 52 by a clip 53 engaged with an engagement groove 57 formed in the engagement projection 52.

4 Claims, 9 Drawing Sheets

SOLENOID VALVE MANIFOLD

TECHNICAL FIELD

The present invention relates to a solenoid valve manifold having a plurality of solenoid valve assemblies, and relates to a solenoid valve manifold effectively applicable to, for example, a split type of collecting the plurality of solenoid valve assemblies and attaching them to a supporting rail.

BACKGROUND ART

A solenoid valve is used for controlling a supply and its stop of compressed air to a pneumatic apparatus such as a pneumatic cylinder or for controlling a pneumatic circuit such as selection or switch of the pneumatic circuit. The solenoid valve includes a pilot-controlled type. This pilot-controlled type comprises: a main valve shaft for switching an output port communicating with the pneumatic apparatus by switching a position of being caused to communicate with a supply port communicating with a compressed air source and a position of being caused to communicate with an exhaust port for exhausting compressed air to the outside; and a pilot-controlled solenoid valve which supplies, to the main valve shaft, pilot pressure for driving axially the main valve shaft, whereby those members constitutes an solenoid valve assembly.

The solenoid valve manifold, in which the plurality of solenoid valve assemblies are collectively attached to a supporting member, includes a monoblock type and a split type. In the monoblock type, the plurality of solenoid valve assemblies are attached to a manifold block in which a common supply path and a common exhaust path are formed and which serves as a supporting member. The split type is also called a divided type, and includes a type in which the plurality of solenoid valve assemblies stacked are fixed by a rail-like supporting member, i.e., a DIN rail, and a type in which the plurality of solenoid valve assemblies stacked are fixed by a tie rod. In the split type, by the solenoid valve assembles which are in a stacked state, supply holes formed in the respective solenoid valve assemblies are continuous to form the common supply path, and exhaust holes are continuous to form the common exhaust path. Patent Document 1 discloses a solenoid valve manifold of the monoblock type, and Patent Document 2 discloses a solenoid valve manifold of the split type. Also, FIG. 1 in Patent Document 3 describes the plurality of solenoid valves stacked.

Patent Document 1: Japanese Patent Application Laid-Open Publication No. 2003-301986
Patent Document 2: Japanese Patent Application Laid-Open Publication No. 11-63348
Patent Document 3: Japanese Patent Application Laid-Open Publication No. 2-163579

DISCLOSURE OF THE INVENTION

Problems to be Solved by the Invention

In the solenoid valve manifold of the split type, a fitting block is attached to an output port formed in the solenoid valve assembly. The fitting block is provided with a tube fitting communicated with the output port, and a tube connected to the pneumatic apparatus is connected to the tube fitting. In an solenoid valve that controls a supply and its stop of compressed air to a double-acting type pneumatic cylinder, a first output port communicating with one of pressure chambers in the pneumatic cylinder and a second output port communicating with the other of the pressure chambers are formed, whereby the fitting block is provided with two tube fittings so as to correspond to the two output ports.

When the solenoid valve assembly is broken down, it is replaced by a new one. In that case, when the fitting block is detached from the broken-down solenoid valve assembly while the tube remains connected without detaching tubes from the tube fittings, it becomes unnecessary to perform an attaching/detaching operation of the tube to/from the tube fittings and simultaneously to mount the fitting block to a new solenoid valve assembly in advance. Therefore, when the solenoid valve assembly is replaced, a replacing operation is easily performed if the fitting block is detached from the solenoid valve assembly.

The ordinary fitting block is attached to the solenoid valve assembly by using a plurality of screws. Therefore, when the solenoid valve assembly is replaced, the screws have to be loosened in order to detach the fitting block from the solenoid valve assembly. For this reason, a tool for loosening the screws is needed, whereby its workability is bad and the detached screws may be lost.

Meanwhile, as described in above Patent Documents, when a clip is engaged with a port connecting tube provided in the fitting block to attach the port connecting tube to the solenoid valve assembly, the tool is not needed. However, since the clip has to be detached from the solenoid valve assembly, the clip may be lost. Moreover, since the clip is engaged with an annular engagement groove formed on an outer circumferential surface of a cylindrical connecting tube, a contact area between the engagement groove and the clip becomes small and an attaching strength of the fitting block cannot be increased. For this reason, in a 5-port solenoid valve in which two port connecting tubes are provided to the fitting block, a fixing strength is intended to be increased by forming an annular engagement groove in each of the two port connecting tubes and by engaging the clip with both of the port connecting tubes. Thus, when the clip is engaged with the two port connecting tubes, a moving distance of the clip becomes long in engaging and detaching the clip with and from the port connecting tubes. Therefore, it is required to ensure, on a surface side of the solenoid valve, a large clip-escaping-space in detaching the clip. For this reason, any appliance cannot be installed so as to be close to a surface of the solenoid valve.

An object of the present invention is to improve attaching/detaching workability of a fitting block, in which a tube fitting is provided, to/from a solenoid valve assembly.

Another object of the present invention is to prevent a clip for fixing the fitting block to the solenoid valve assembly from being lost.

Another object of the present invention is to reduce a moving distance of the clip in attaching/detaching the fitting block to/from the solenoid valve assembly.

Another object of the present invention is to enhance a strength for fixing the fitting block to the solenoid valve assembly by the clip.

Means for Solving the Problems

A solenoid valve manifold according to the present invention comprises: an approximately quadrangular plate-like solenoid valve assembly in which a supply hole and an exhaust hole are formed so as to penetrate therethrough in a thickness direction and in both surfaces of which abutting surfaces are provided; a fitting block provided with a port connecting tube detachably fitted in an output port formed so as to be open in a side surface of the solenoid valve assembly, and a tube fitting to which a tube communicating with the output port is connected; an engagement projection provided to the fitting block, and engaged with a concave portion formed adjacently to the output port in the side surface of the solenoid valve assembly; and a clip movably mounted to the solenoid valve assembly, and fixing the fitting block via a portion of the engagement projection, the clip including leg portions engaged with respective engagement grooves formed in both surfaces of the engagement projection, and an operating portion linking the leg portions by respective distal portions of the leg portions.

The solenoid valve manifold according to according to the present invention is such that an entirety of each of the engagement grooves is engaged with the clip.

The solenoid valve manifold according to the present invention is such that the clip is provided with a stopper which abuts on a movement regulating portion provided to the solenoid valve assembly when the clip is moved in a direction in which the clip is separate from the engagement grooves.

The solenoid valve manifold according to the present invention is such that a slide plate is mounted on a surface of the solenoid valve assembly so as to be movable between a position of covering the operating portion of the clip and a position of exposing the operating portion to an outside.

The solenoid valve manifold according to the present invention is such that the fitting block is provided with a first port connecting tube fitted in a first output port formed so as to be open in the side surface of the solenoid valve assembly, and a second port connecting tube fitted in a second output port formed in parallel with the first output port, the engagement projection being provided between the first port connecting tube and the second port connecting tube.

Effect of the Invention

According to the present invention, when any of the plurality of solenoid valve assemblies constituting the solenoid valve manifold is detached from a supporting member or tie rod, the fitting block on which the tubes remain connected without detaching the tubes from the fitting block can be detached from the solenoid valve assembly. Similarly, also when the solenoid valve assembly is assembled, the fitting block on which the tubes remain connected can be attached to the solenoid valve assembly. Such a detaching operation and an attaching operation can be easily performed by moving the clip.

The clip which fixes the fitting block to the solenoid valve assembly is engaged with the engagement projection provided to the fitting block, and the entire engagement grooves of the engagement projection are engaged with the clip. Therefore, a fixing strength of the fitting block to the solenoid valve assembly can be enhanced.

Moving distances of the clip in engaging the clip with the engagement projection and in releasing the engagement is length dimensions of the engagement grooves, so that a space ensured on a surface side of the solenoid valve manifold to move the clip for an escape can be small, whereby the space on the surface side can be effectively utilized. Particularly, when the fitting block having two port connecting tubes is mounted on the solenoid valve assembly, if the clip is engaged with the two port connecting tubes, it is required to move the clip a long distance. However, since the clip is engaged with the engagement projection, the fitting block can be easily attached/detached to/from the solenoid valve assembly by moving and operating the clip a short distance.

When the clip is moved for pull-out, the stopper abuts on the movement regulating portion of the solenoid valve assembly, so that the clip is retained by the solenoid valve assembly without being detached from the solenoid valve assembly. Therefore, an occurrence of loss of the clip can be prevented. Moreover, since the clip is covered with the slide plate, appearance quality of the surface side of the solenoid valve manifold is improved and simultaneously any improper pulling and moving operations of the clip can be prevented from being performed.

BEST MODE FOR CARRYING OUT THE INVENTION

Figure 1:
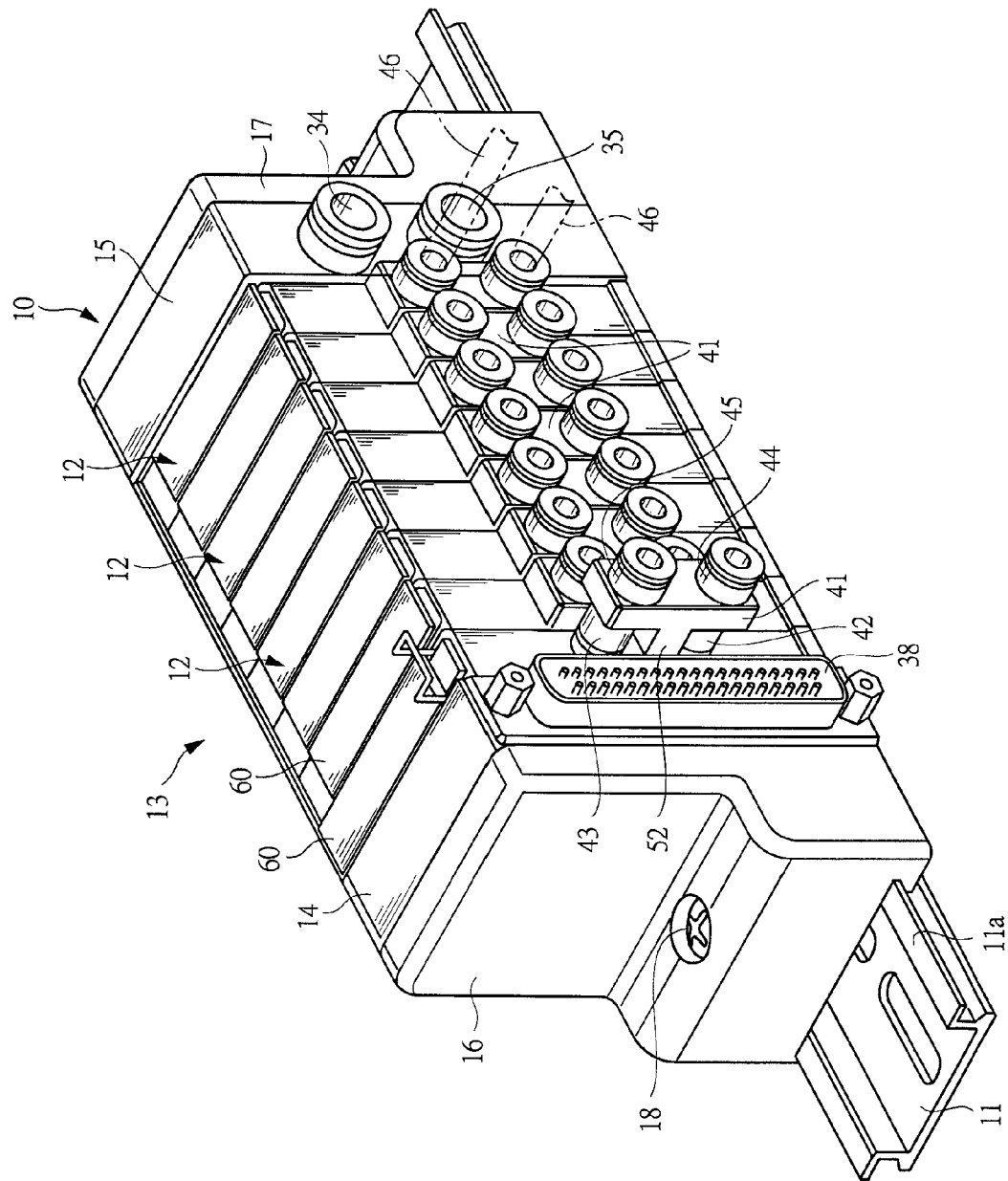
FIG. 1 is a perspective view showing a solenoid valve manifold which is an embodiment of the present invention.

A solenoid valve manifold 10 shown in FIG. 1 is a split type, i.e., a divided type, and has eight solenoid valve assemblies 12, which are in a mutually stacked state and are supported by a DIN rail 11 serving as a rail-like supporting member. A power feeding block 14 abuts on one end face of an assembly unit 13, which is formed by the eight solenoid valve assemblies 12, and a supply/exhaust block 15 abuts on the other end face thereof. An end block 16 abuts on the power feeding block 14, and an end block 17 abuts on the supply/exhaust block 15. Each of the end blocks 16 and 17 is fixed to the DIN rail 11 by screw members 18, and the solenoid valve assemblies 12, power feeding block 14, and supply/exhaust block 15 are fastened respectively to the DIN rail 11 by the end blocks 16 and 17. Although FIG. 1 shows the solenoid valve manifold having the eight solenoid valve assemblies 12, the number of the solenoid valve assemblies 12 may be arbitrary.

Figure 2:
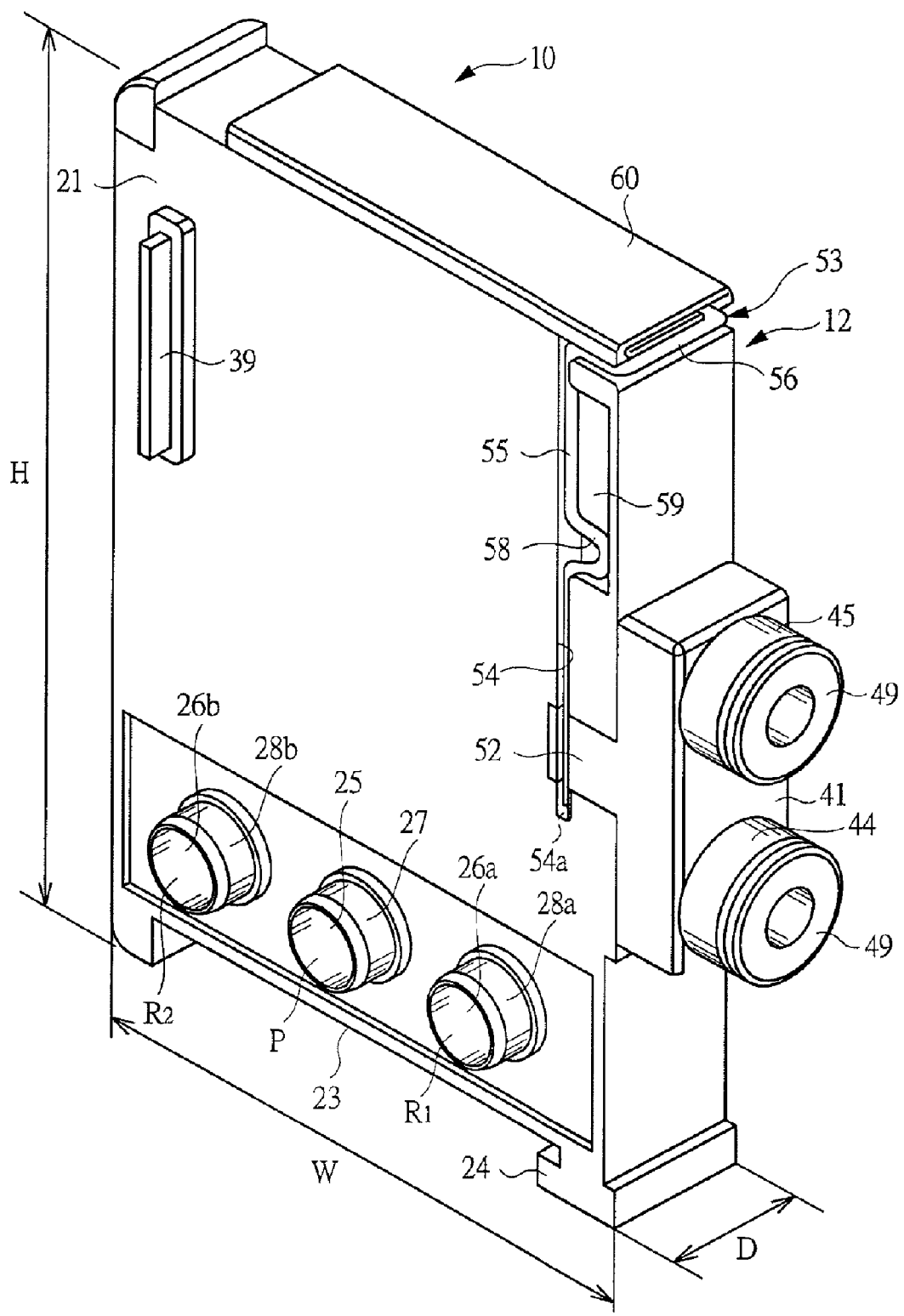
FIG. 2 is a perspective view enlargedly showing the solenoid valve assembly shown in FIG. 1.

As shown in FIG. 2, each of the solenoid valve assemblies 12 has a length dimension H, a width dimension W, and a thickness dimension D, wherein its vertical direction is longer than its horizontal direction in the drawing and it is an approximately rectangular-plate shape in the whole. Both of front and rear surfaces of each of the solenoid valve assemblies 12 serve as abutting surfaces 21 and 22, and each of the abutting surfaces 21 of the solenoid valve assemblies 12 abuts on the abutting surface 22 of each of the other solenoid valve assemblies 12 adjacent thereto, whereby the plurality of solenoid valve assemblies 12 become in a stacked state. In a lower end portion of the solenoid valve assembly 12 in FIG. 2, a concave portion 23 into which the DIN rail 11 is inserted is formed, and simultaneously an engagement portion 24 to be engaged with a flange 11a of the DIN rail 11 is provided. The power feeding block 14, supply/exhaust block 15, and end blocks 16 and 17 are also provided with engagement portions similarly thereto, and these are fixed to the DIN rail 11.

Figure 3:
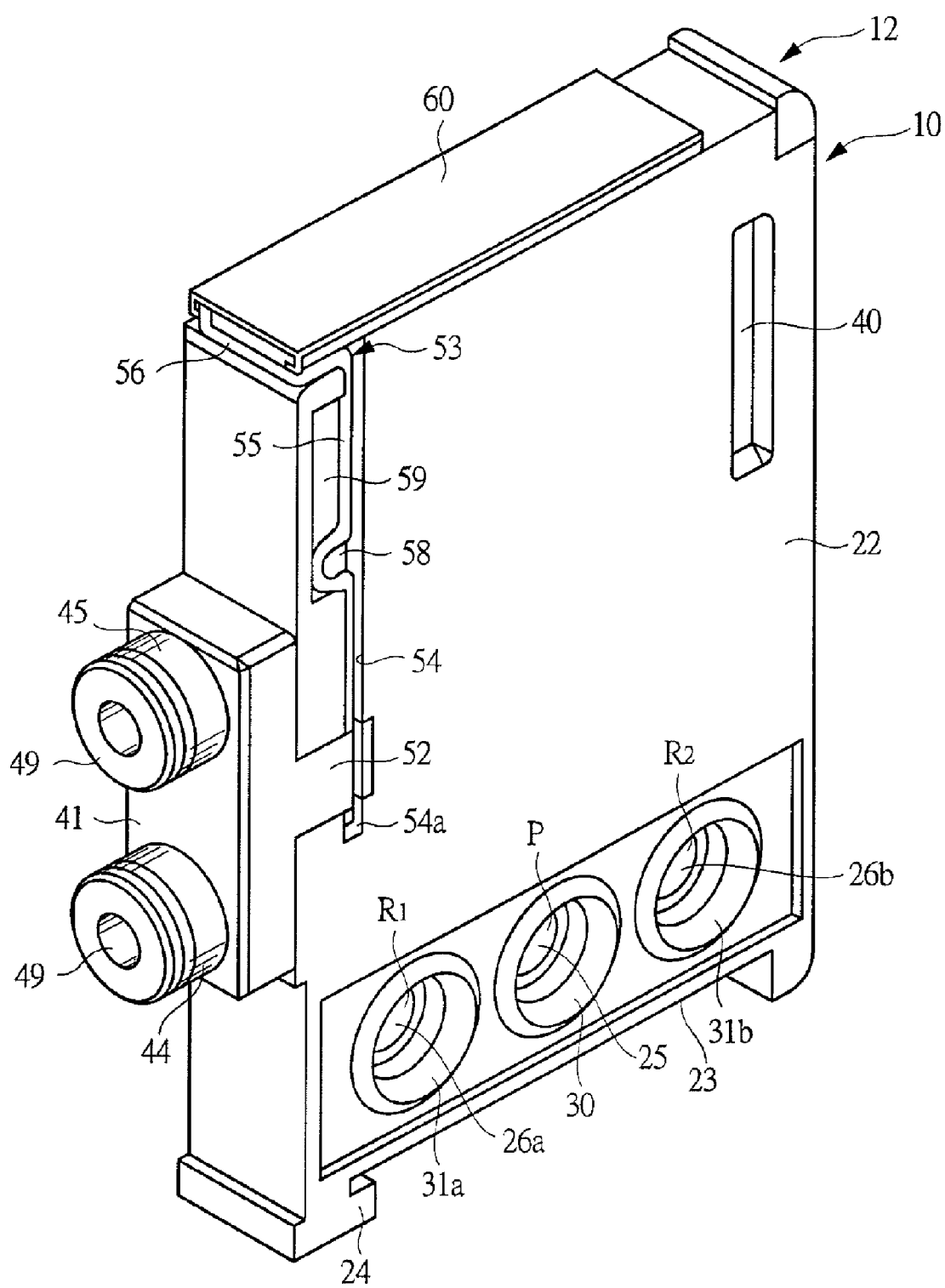
FIG. 3 is a perspective view showing a rear surface side of FIG. 2.

The solenoid valve assembly 12 is a 5-port solenoid valve of a pilot-controlled type, wherein, as shown in FIG. 2, a supply hole 25 is formed in a lower end portion thereof so as to penetrate therethrough in a thickness direction and this supply hole 25 serves as a supply port P. On both sides of the supply hole 25 in a lateral direction, exhaust holes 26a and 26b are respectively formed so as to penetrate therethrough in a thickness direction, and the exhaust holes 26a and 26b serve as exhaust ports R1 and R2, respectively. The lower end portion of the solenoid valve assembly 12 is provided with a hollow projection 27 having the supply hole 25 so as to project longer in the thickness direction of the solenoid valve assembly 12 than the abutting surface 21, and is also provided with hollow projections 28a and 28b having the exhaust holes 26a and 26b so as to project in the thickness direction. As shown in FIG. 3, portions of the supply hole 25 and the exhaust holes 26a and 26b located on a side of the abutting surface 22 serve as fitting holes 30, 31a, and 31b. Thus, the hollow projections 27, 28a, and 28b of one of the solenoid valve assemblies 12 are fitted in the fitting holes 30, 31a and 31b of the other solenoid valve assemblies 12 adjacent thereto, whereby the supply holes 25 of all the solenoid valve assemblies 12 become in a mutually continuous state and all the exhaust holes 26a and 26b become in a mutually continuous state.

Figure 5:
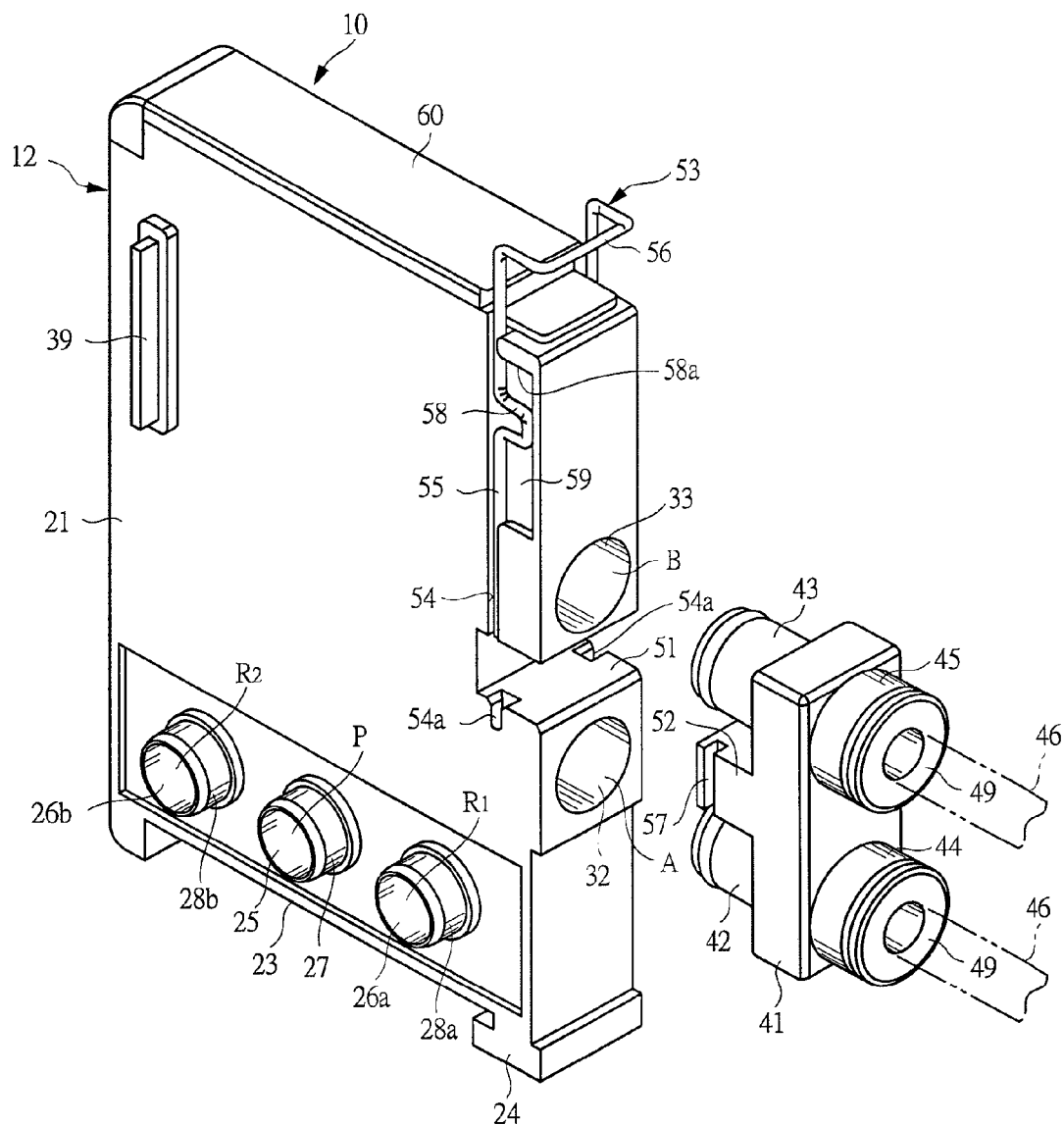
FIG. 5 is a perspective view showing the solenoid valve assembly in a state where the fitting block is detached therefrom.

As shown in FIG. 5, two fitting holes 32 and 33, which are open in a side surface of the assembly, are formed in the solenoid valve assembly 12, and the fitting holes 32 and 33 thereof serve as output ports A and B, respectively. The one output port A is switched, by an unshown main valve shaft incorporated in the solenoid valve assembly 12, between a state of communicating with the supply port P and a state of communicating with the exhaust port R1. The other output port B is switched between the state of communicating with the supply port P and a state of communicating with the exhaust port R2. In order to switching and operating the main valve shaft, a pilot solenoid valve is incorporated in the solenoid valve assembly 12, wherein when the main valve shaft is disposed in the horizontal direction of FIG. 2, the pilot solenoid valve is located and incorporated on an upper side of the main valve shaft. Incidentally, when the main valve shaft is provided in a right-side portion of the solenoid valve assembly 12 so as to be located in the vertical direction of FIG. 2, the pilot solenoid valve may be disposed in a left side of the main valve shaft.

Figure 6:
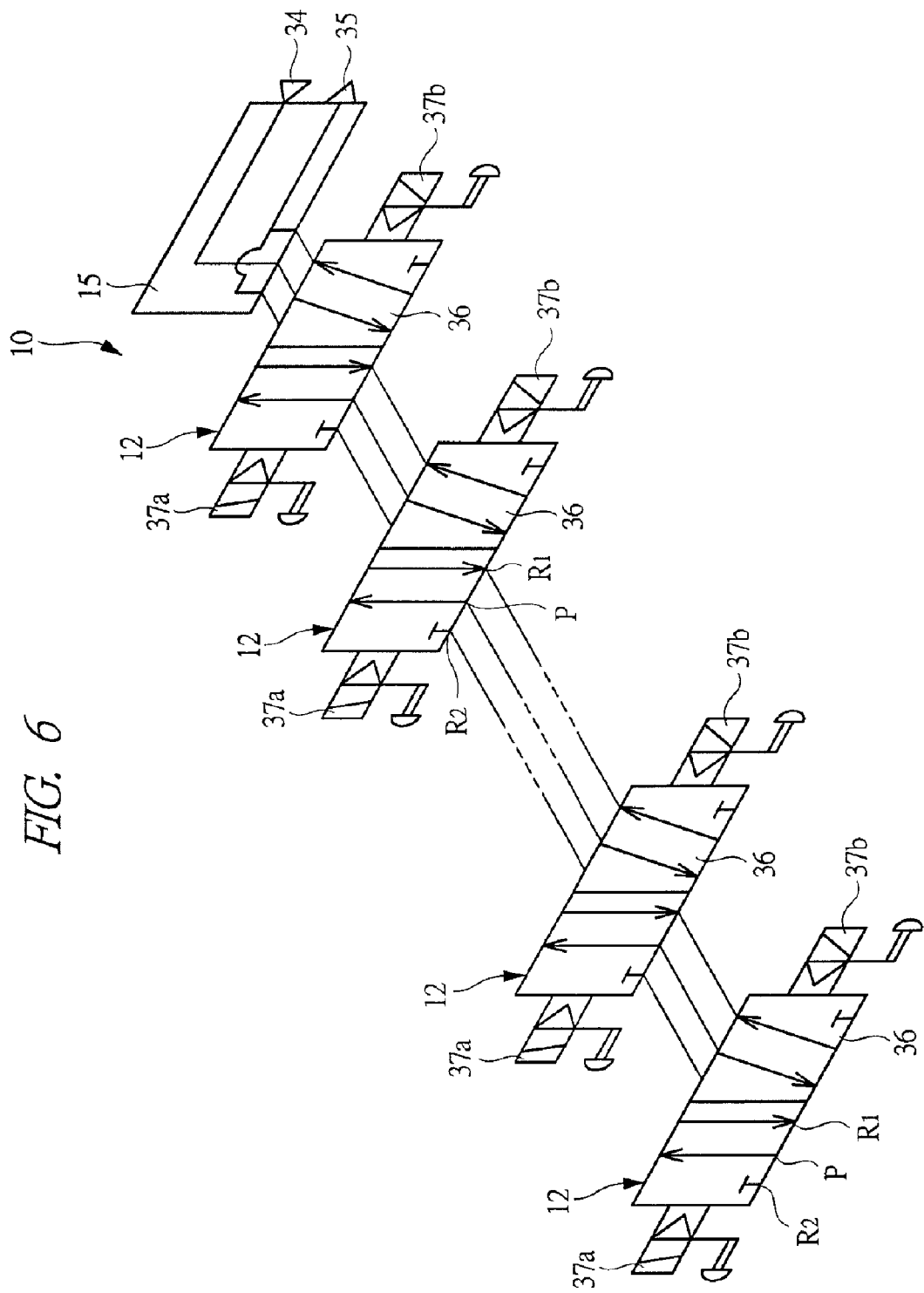
FIG. 6 is a pneumatic circuit diagram of the solenoid valve manifold shown in FIG. 1.

As shown in FIG. 1, the supply/exhaust block 15 is provided with a common supply port 34 communicating with the continuous supply holes 25, and is provided with a common exhaust port 35 communicating with both of the continuous exhaust holes 26a and 26b. FIG. 6 schematically shows a pneumatic circuit diagram of the solenoid valve manifold 10 shown in FIG. 1, wherein the solenoid valve assembly 12 has the main valve shaft 36 which is actuated at a first position where the supply port P is caused to communicate with the output port B and simultaneously the output port A is caused to communicate with the exhaust port R1 and at a second position where the supply port P is caused to communicate with the output port A and simultaneously the output port B is caused to communicate with the exhaust port R2. Note that FIG. 6 shows a state where each of the solenoid valve assemblies 12 is at the first position. In the solenoid valve assembly 12, two pilot solenoid valves are incorporated. When a current is carried to a solenoid 37a of the one pilot solenoid valve, the main valve shaft 36 is driven up to the second position by pilot pressure. When the current is carried to a solenoid 37b, the main valve shaft 36 is driven up to the first position by the pilot pressure. Note that, in FIG. 6, only four of the eight solenoid valve assemblies 12 are shown.

When one solenoid valve manifold 10 is composed by the eight solenoid valve assemblies 12 each having two pilot solenoid valves, the one solenoid valve manifold 10 has 16 solenoids in total, wherein, in order that the current is carried to each of the solenoids, as shown in FIG. 1, the power feeding block 14 is provided with a connector 38 to which a signal cable is connected from the outside. As shown in FIG. 2, one surface of the solenoid valve assembly 12 is provided with electrodes 39 serving as a male side so as to correspond to power feeding pins of the connector 38 and to project longer than the abutting surface 21. As shown in FIG. 3, the other surface thereof is provided with electrodes 40 serving as a female side. Therefore, when the respective solenoid valve assemblies 12 are stacked, each of the solenoids is electrically connected to each of the corresponding power feeding pins of the connector 38. Incidentally, a through hole may be formed at portions of the electrodes 39 and 40 shown in FIGS. 2 and 3 to lay a signal cable therein.

A fitting block 41 is intended to be detachably mounted to the solenoid valve assembly 12, and FIG. 1 is shown in a state where the fitting block 41 of one of the eight solenoid valve assemblies 12 is detached from the solenoid valve assembly 12.

Figure 7:
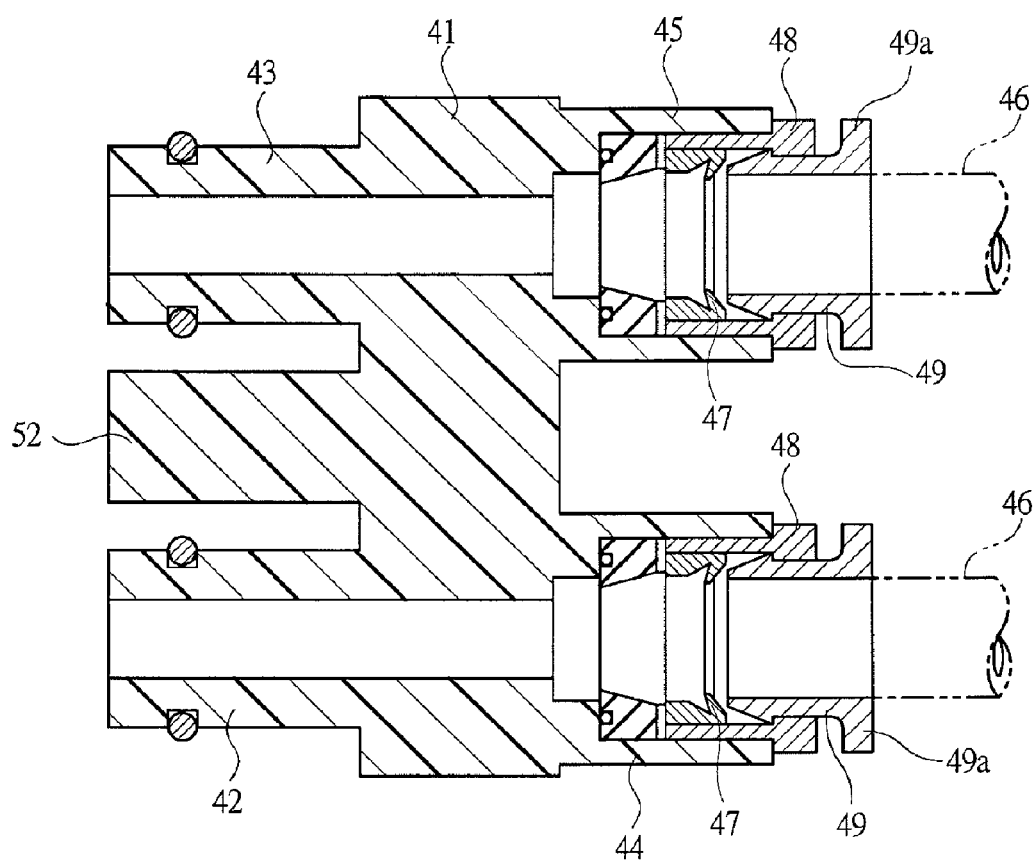
FIG. 7 is a sectional view of the fitting block.

FIG. 7 is a sectional view of the fitting block 41, wherein the fitting block 41 is provided integrally with a port connecting tube 42 fitted in the fitting hole 32 serving as the output port A and with a port connecting tube 43 fitted in the fitting hole 33 serving as the output port B. Outer end portions of the port connecting tubes 42 and 43 are tube fittings 44 and 45, and hoses, i.e., tubes 46 which communicate with the output ports A and B to guide air are connected to the tube fittings 44 and 45, respectively.

As shown in FIG. 7, a supporting ring 48 in which a lock claw 47 is provided is fitted in each of the tube fittings 44 and 45, and an open ring 49 is fitted axially reciprocably in the supporting ring 48 so that its tip portion abuts on the lock claw 47. When the open ring 49 is pushed in, the lock claw 47 is elastically deformed radially outward by the open ring 49.

Therefore, when the tube 46 is inserted into the open ring 49 of each of the tube fittings 44 and 45, the lock claw 47 is elastically deformed so as to expand radially outward, thereby permitting an inserting operation of the tube 46. When the tube 46 is pulled in such a state so as to be detached from the tube fitting, the lock claw 47 is pressed against the tube 46, thereby preventing detachment of the tube 46 by a self-tightening action of the lock claw 47. Meanwhile, when the tube 46 is to be detached from each of the tube fittings 44 and 45, if the open ring 49 is pushed in, the lock claw 47 is elastically deformed radially outward and the lock claw 47 becomes in a state of being separate from the tube 46. When the tube 46 is pulled in such a state, the tube 46 can be detached from each of the tube fittings 44 and 45. Thus, the tube fittings 44 and 45 each have a quick fitting structure. As shown in FIG. 1, similar quick fittings are provided also in the common supply port 34 and the common exhaust port 35 of the supply/exhaust block 15.

As shown in FIG. 5, a concave portion 51 located between the two output ports A and B is formed in the side surface of the solenoid valve assembly 12. Meanwhile, an engagement projection 52 to be engaged with the concave portion 51 is provided to the fitting block 41 and between the two port connecting tubes 42 and 43, wherein the engagement projection 52 has a quadrangular cross section and projects from a rear surface of the fitting block 41 in parallel with each of the port connecting tubes 42 and 43. Therefore, when the port connecting tubes 42 and 43 are fitted respectively in the fitting holes 32 and 33 serving as the output ports A and B, the engagement projection 52 enters into and is engaged with the concave portion 51.

A clip 53 for detachably attaching the fitting block 41 to the solenoid valve assembly 12 via a portion of the engagement projection 52 is mounted in the solenoid valve assembly 12. The clip 53 comprises: two leg portions 55, which are incorporated into guide grooves 54 formed in both surfaces 21 and 22 of the solenoid valve assembly 12 and are slid in the vertical direction of the drawing along the grooves, i.e., in a direction perpendicular to the DIN rail 11; and an operating portion 56 linking distal portions of both the leg portions to each other. An engagement groove 57 is formed in each of both surfaces of the engagement projection 52, whereby the leg portions 55 are respectively engaged with the engagement grooves 57. Since the engagement groove 57 is formed along a flat outer surface of the engagement projection 52 so as to be straight, an entirety of the engagement groove 57 becomes in a state of being engaged with the clip 53, whereby the clip 53 and the engagement projection 52 are firmly fastened to each other.

Figure 4:
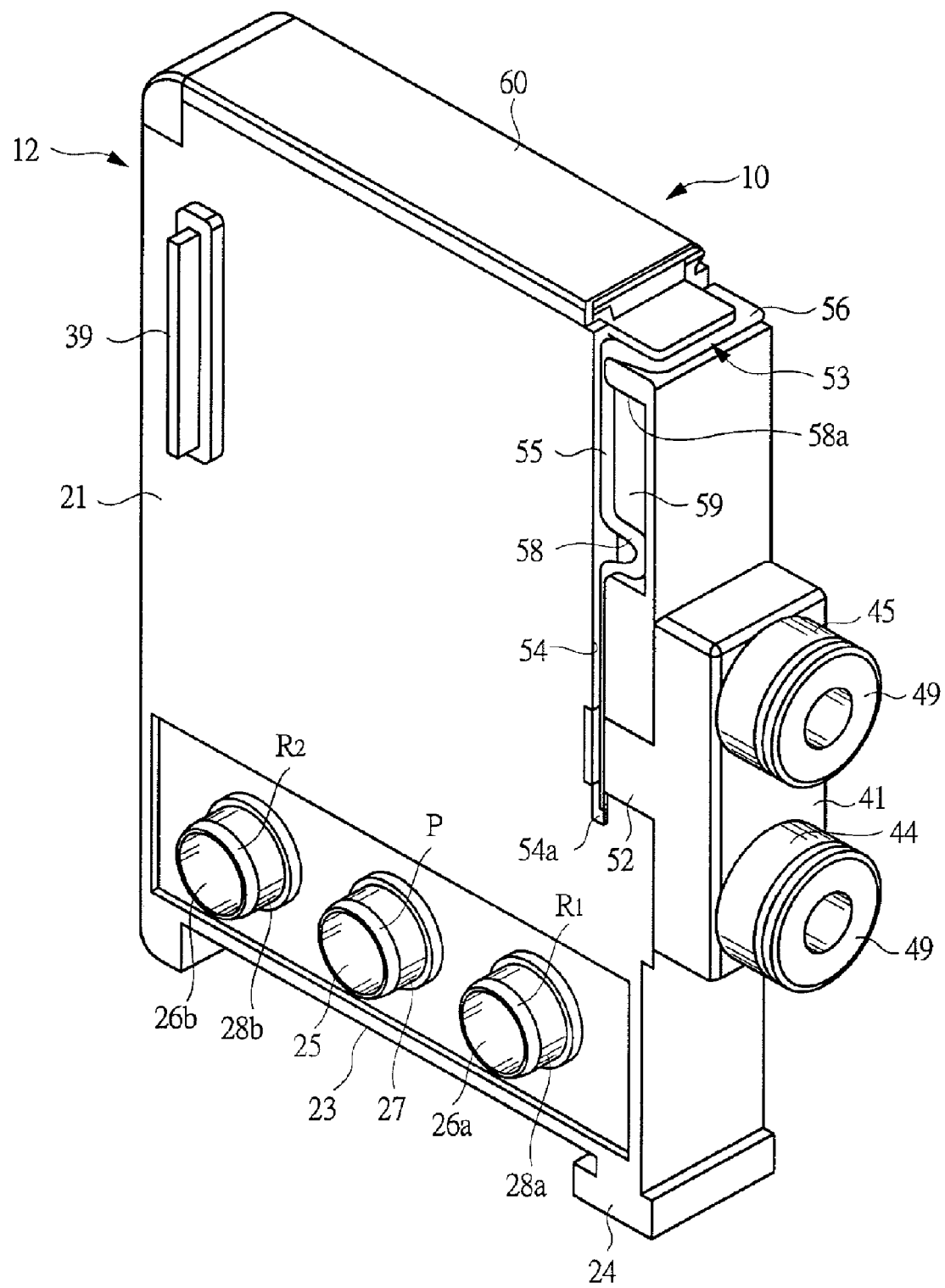
FIG. 4 is a perspective view showing the solenoid valve assembly in a state where a fitting block is mounted thereon.

As shown in FIG. 5, after the fitting block 41 is mounted in the solenoid valve assembly 12 in a state where the clip 53 is moved above a position where its tip surfaces are withdrawn from the concave portion 51, when the clip 53 is moved downward, as shown in FIG. 4, the leg portions 55 of the clip 53 are respectively engaged with the engagement grooves 57. Accordingly, the fitting block 41 is fixed to the solenoid valve assembly 12 via a portion of the engagement projection 52. At this time, tips of the leg portions 55 enter into tip receiving portions 54a, which are terminal portions of the guide grooves 54, and the tips of the clip are retained by the tip receiving portions 54a.

Thus, in a state where the leg portions 55 of the clip 53 are engaged with the engagement grooves 57, the tips of the clip are retained by the tip receiving portions 54a of the guide grooves 54, and simultaneously the engagement grooves 57 are engaged with the clip 53 via their entire vertical dimensions, so that the fitting block 41 is firmly fastened to the solenoid valve assembly 12, which results in an increase of a fastening strength. Moreover, a moving distance of the clip 53 between a position for engaging the leg portions 55 of the clip 53 with the engagement projection 52 and a position for releasing the engagement is a total dimension of the vertical dimension of the concave portion 51 and a dimension of the tip receiving portion 54a, so that the moving distance of the clip 53 becomes short as compared with a conventional technique in which the clip 53 is engaged with the two port connecting tubes 42 and 43, whereby the attaching/detaching workability of the fitting block 41 to/from the solenoid valve assembly 12 is improved. As the moving distance of the clip 53 gets short, as shown in FIG. 5, the fastening of the fitting block 41 to the solenoid valve assembly 12 can be released by moving the clip 53 a short distance upward. Therefore, it is unnecessary to ensure a large clip-escaping-space above the assembly unit 13 of the solenoid valve manifold 10, whereby another appliance can be disposed so as to be close to the surface of the assembly unit 13.

The leg portions 55 of the clip 53 are provided with stoppers 58, and the solenoid valve assembly 12 is provided with notch portions 59 for guiding the stoppers 58 when the clip 53 is moved in the vertical direction and between a position where the leg portions 55 are engaged with the engagement grooves 57 and a position where the engagement is released. In order to prevent the clip 53 from being detached from the solenoid valve assembly 12 when the clip 53 is moved upward, movement regulating portions 58a abutting on the stoppers 58 are provided. Therefore, the clip 53 is not detached from the solenoid valve assembly 12 by abutment between the stoppers 58 and the movement regulating portions 58a, whereby a loss of the clip 53 in a state where the fitting block 41 is detached can be prevented.

The clip 53 is formed by bending a steel-made wire material. The operating portion 56 of the clip 53 is bent orthogonally to the leg portions 55, so that, as shown in FIG. 4, when the clip 53 is pushed down up to an engagement position, the operating portion 56 is along an outer circumferential surface of the solenoid valve 12.

A rectangular slide plate 60 is mounted on the surface of the solenoid valve assembly 12 so as to be movable between a position for covering the operating portion 56 of the clip 53 as shown in FIG. 2 and a position where the operating portion 56 is exposed to the outside as shown in FIG. 4. Therefore, since the clip 53 is shielded by the slide plate 60 and cannot be seen from the outside when the solenoid valve manifold 10 has been in use, an improper operation of the clip 53 is prevented and simultaneously since the operating portion 56 of the clip 53 is covered with the slide plate 60, appearance quality of the solenoid valve manifold is improved.

By the solenoid valve manifold 10 shown in FIG. 1, compressed air from the air pressure source via the tube 46 connected to the supply port 34 of the supply/exhaust block 15 can be supplied to a pneumatic apparatus such as a pneumatic cylinder via the tubes 46 connected to the respective fitting blocks 41. Incidentally, FIG. 1 shows a state where the tubes 46 are connected only to the supply port 34 and the exhaust port 35 and the tube fittings 44 and 45 of one of the fitting blocks 41.

When any one of the solenoid valve assemblies 12 is broken down, the solenoid valve assembly 12 is replaced by a new one. In this time, without detaching the tubes 46 from the fitting block 41, gaps are generated on both sides of the broken-down solenoid valve assembly 12 by loosening the screw members 18 of the end blocks 16 and 17. Under such a state, first of all, the slide plate 60 is moved as shown in FIG. 4 so as to expose the operating portion 56 of the clip 53 to the outside. Then, the engagement between the leg portions 55 and the engagement grooves 57 is released by moving the clip 53 above the surface of the solenoid valve assembly 12 as shown in FIG. 5. Under such a state, when the fitting block 41 is pulled while the tubes 46 remain connected as shown in FIG. 5, the fitting block 41 can be easily detached from the solenoid valve assembly 12. After the fitting block 41 is detached, the broken-down solenoid valve assembly 12 is detached from the DIN rail 11 and replaced by a new one. When the fitting block 41 is to be mounted to the new solenoid valve assembly 12, the fitting block 41 is attached to the solenoid valve assembly 12 by a reversed procedure to an above-described procedure. This attaching operation can be performed in a state where the tubes 46 are attached to the fitting block 41, so that a mounting operation of the tubes 46 onto the solenoid valve manifold becomes unnecessary.

Figure 8:
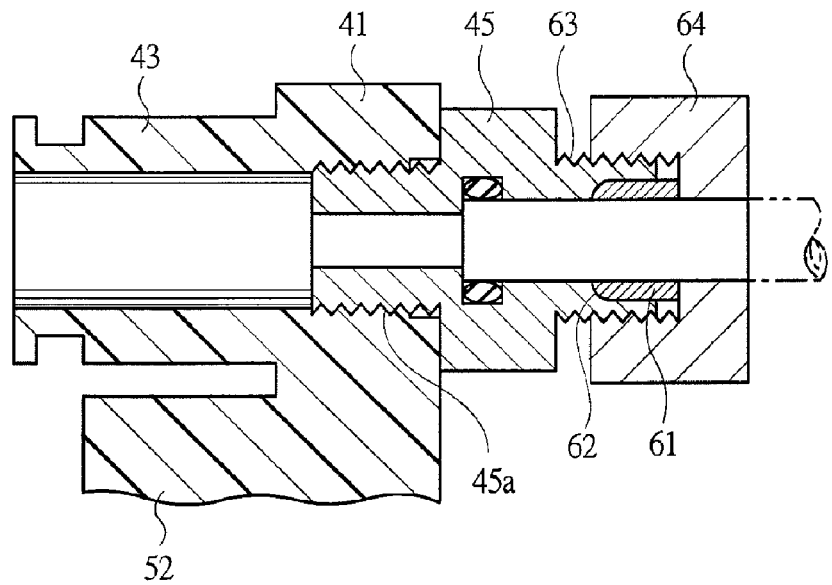
FIG. 8 is a sectional view showing a modification example of the tube fitting to which a tube is connected.
Figure 9:
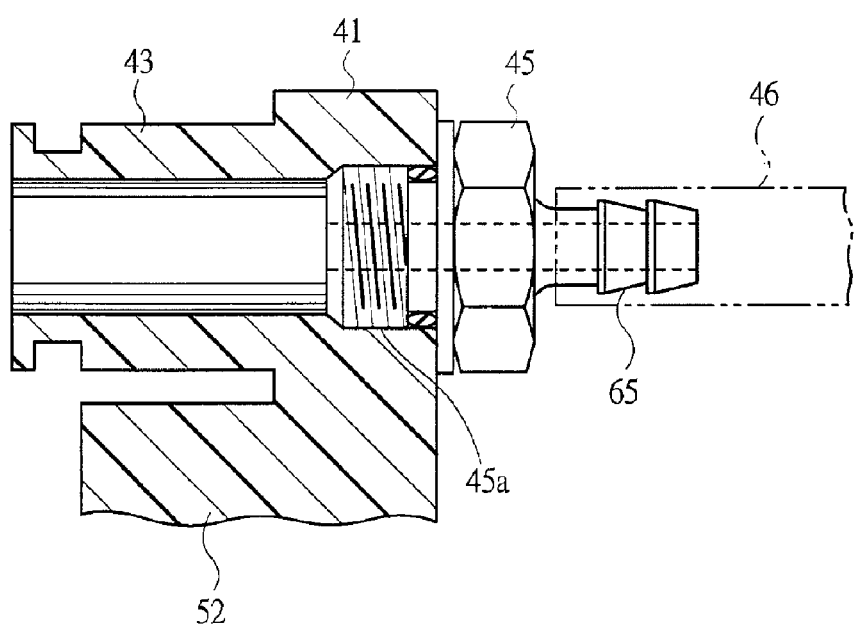
FIG. 9 is a sectional view showing a modification example of the tube fitting to which the tube is connected.

FIGS. 8 and 9 are sectional views showing modification examples of the tube fitting 45 to which the tube 46 is connected. The tube fitting 45 shown in FIG. 8 has a structure of flareless tube fitting, wherein the tube fitting 45 is screwed by a male screw portion 45a to the fitting block 41 with which the port connecting tube 43 is integrated. A fastening sleeve 61 which is elastically deformable radially is incorporated inside the tube fitting 45, and a tapered surface 62 is formed on a tip of the fastening sleeve 61. A union nut 64 is intended to be screwed to a male screw 63 formed on the tube fitting 45.

When the union nut 64 is rotated and fastened to the tube fitting 45 in a state where the tube 46 is inserted until it abuts on an abutting surface formed at the tube fitting 45, the fastening sleeve 61 elastically deforms radially inward, whereby the tube 46 is fastened to the tube fitting 45. Meanwhile, when the union nut 64 is loosened, close contact between the fastening sleeve 61 and the tube 46 is released, whereby the tube 46 can be easily detached from the tube fitting 45. Thus, when the tube 46 is fastened to the tube fitting 45 by rotating the union nut 64, since the engagement projection 52 is engaged with the concave portion 51, rotation of the fitting block 41 can be prevented during rotation of the union nut 64.

The tube fitting 45 shown in FIG. 9 has a barb fitting structure, wherein the tube fitting 45 is screwed by a male screw portion 45a to the fitting block 41 with which the port connecting tube 43 is integrated similarly to the case shown in FIG. 8. A plurality of annular engagement projections 65 whose each outer circumferential surface has a tapered shape are provided outside the tube fitting 45. The tube 46 is attached to the tube fitting 45 so as to be fitted outside the annular engagement projections 65. Although the FIG. 8 and FIG. 9 show the tube fitting 45, the other tube fitting 44 may also have a flareless tube fitting structure or barb fitting structure. Note that, in the case of the fitting block 41 shown in FIG. 7, although rear end portions of the port connecting tubes 42 and 43 are the tube fittings 44 and 45, each of the tube fittings 44 and 45 may be screwed or bonded to the fitting block 41.

As shown in FIG. 6, the solenoid valve assembly 12 is a 5-port 2-position switching valve having the two solenoids 37a and 37b, but may be an solenoid valve of another type as long as it is a pilot-controlled type in which pilot pressure is supplied to the main valve shaft by the solenoid.

Figure 10A:
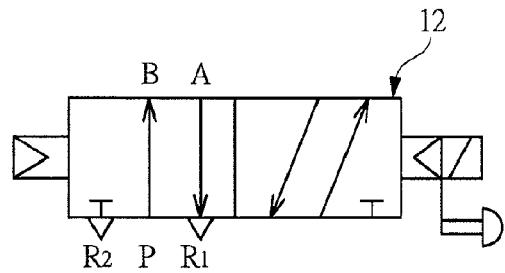
FIGS. 10A to 10D are each a schematic view showing a solenoid valve of another type.
Figure 10B:
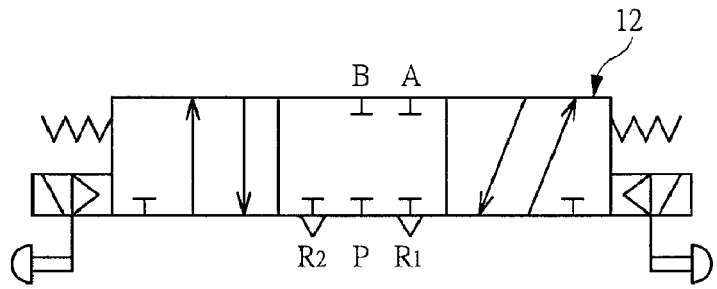
Figure 10C:
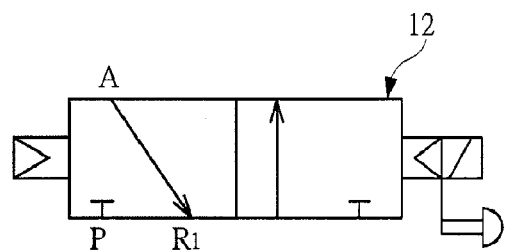
Figure 10D:
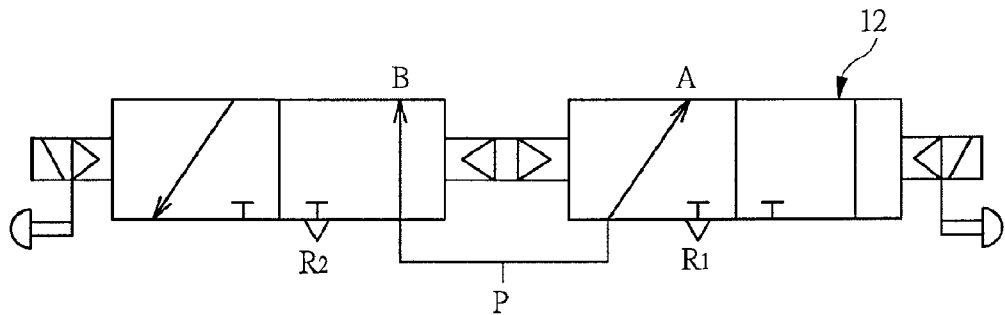

FIGS. 10A to 11D are schematic diagrams showing solenoid valves of other types, respectively. FIG. 10A shows a 5-port 2-position switching valve of a single solenoid, and FIG. 10B shows a 5-port 3-position switching valve of double solenoids. FIG. 10C shows a 3-port 2-position switching valve, and FIG. 10D shows a tandem 3-port 2-position switching valve. Thus, various modes can be employed as an solenoid valve mode of the solenoid valve assembly 12.

The present invention is not limited to the above-described embodiments, and can variously be modified within a scope of not departing from the gist thereof. For example, although the plurality of solenoid valve assemblies 12 are intended to be fixed to the DIN rail 11, they may be fixed by a tie rod. Also, if it is assumed that an end portion of the solenoid valve assembly 12 engaged with the DIN rail 11 is a lower end portion, the main valve shaft is incorporated on a side of the lower end portion and the solenoid is incorporated on its upper side, whereby it has a rectangular shape that is long in the vertical direction. However, the solenoid valve assembly 12 may have a rectangular shape that is long in the horizontal direction by disposing the main valve shaft and the solenoid adjacently to each other in the horizontal direction.

INDUSTRIAL APPLICABILITY

The solenoid valve manifold is used for controlling a supply of compressed air to a pneumatic apparatus such as a pneumatic cylinder.

The invention claimed is:

1. A solenoid valve manifold comprising:
   an approximately quadrangular plate-like solenoid valve assembly in which a supply hole and an exhaust hole are formed so as to penetrate therethrough in a thickness direction and in both surfaces of which abutting surfaces are provided;
   a fitting block provided with a port connecting tube detachably fitted in an output port formed so as to be open in a side surface of the solenoid valve assembly, and a tube fitting to which a tube communicating with the output port is connected;
   an engagement projection provided to the fitting block, and engaged with a concave portion formed adjacently to the output port in the side surface of the solenoid valve assembly; and
   a clip movably mounted to the solenoid valve assembly, and fixing the fitting block via a portion of the engagement projection, the clip including leg portions engaged with respective engagement grooves formed in both surfaces of the engagement projection, and an operating portion linking the leg portions by respective distal portions of the leg portions,
   wherein the fitting block is provided with a first port connecting tube fitted in a first output port formed so as to be open in the side surface of the solenoid valve assembly, and a second port connecting tube fitted in a second output port formed in parallel with the first output port, the engagement projection being provided between the first port connecting tube and the second port connecting tube.

2. The solenoid valve manifold according to claim 1, wherein an entirety of each of the engagement grooves is engaged with the clip.

3. The solenoid valve manifold according to claim 1, wherein the clip is provided with a stopper which abuts on a movement regulating portion provided to the solenoid valve assembly when the clip is moved in a direction in which the clip is separate from the engagement grooves.

4. A solenoid valve manifold comprising:
   an approximately quadrangular plate-like solenoid valve assembly in which a supply hole and an exhaust hole are formed so as to penetrate therethrough in a thickness direction and in both surfaces of which abutting surfaces are provided;
   a fitting block provided with a port connecting tube detachably fitted in an output port formed so as to be open in a side surface of the solenoid valve assembly, and a tube fitting to which a tube communicating with the output port is connected;
   an engagement projection provided to the fitting block, and engaged with a concave portion formed adjacently to the output port in the side surface of the solenoid valve assembly; and
   a clip movably mounted to the solenoid valve assembly, and fixing the fitting block via a portion of the engagement projection, the clip including leg portions engaged with respective engagement grooves formed in both surfaces of the engagement projection, and an operating portion linking the leg portions by respective distal portions of the leg portions,
   wherein a slide plate is mounted on a surface of the solenoid valve assembly so as to be movable between a position of covering the operating portion of the clip and a position of exposing the operating portion to an outside.

* * * * *